United States Patent [19]

Williams

[11] Patent Number: 4,862,624
[45] Date of Patent: Sep. 5, 1989

[54] DOVE TAIL CLAMPING DEVICE FOR TELESCOPIC GUN SIGHT MOUNT

[75] Inventor: Paul D. Williams, Davison, Mich.

[73] Assignee: Williams Gun Sight Company, Davison, Mich.

[21] Appl. No.: 187,910

[22] Filed: Apr. 29, 1988

[51] Int. Cl.$^4$ .................................................. F41G 1/38
[52] U.S. Cl. ............................................ 42/101; 33/250
[58] Field of Search ............... 42/100, 101; 33/245, 33/250, 233, 234

[56] References Cited

U.S. PATENT DOCUMENTS

| | | | |
|---|---|---|---|
| 2,567,535 | 9/1951 | Willis et al. | 33/250 |
| 2,777,202 | 1/1957 | Conte | 42/101 |
| 3,199,202 | 8/1965 | Williams | 33/256 |
| 3,406,455 | 10/1968 | Akin, Jr. | 42/101 |
| 3,611,606 | 10/1971 | Sefried et al. | 42/101 |
| 3,877,166 | 4/1975 | Ward | 42/101 |
| 3,986,285 | 10/1976 | Krisay | 42/101 |
| 4,008,536 | 2/1977 | Adams | 42/100 |
| 4,383,371 | 5/1983 | Coffey | 42/101 |

Primary Examiner—Deborah L. Kyle
Assistant Examiner—Michael J. Carone
Attorney, Agent, or Firm—Harness, Dickey, Pierce

[57] ABSTRACT

A telescopic sight mount for a rifle having an elongated mounting flange, comprising an elongated base having a pair of longitudinally oriented side members configured to be seated upon the mounting flange, a pair of clamping brackets, clamping screws for laterally impelling the clamping brackets to exert a clamping force upon the mounting flange, and a pair of scope mounting rings extending upwardly from the base.

7 Claims, 1 Drawing Sheet

DOVE TAIL CLAMPING DEVICE FOR TELESCOPIC GUN SIGHT MOUNT

BACKGROUND OF THE INVENTION

The present invention relates to a scope mount and more particularly to a device for clamping a telescopic gun sight to a dove-tail tongue on the barrel of a gun.

Telescopic sights are a widely used optional accessory for firearms, particularly rifles, and facilitate the accurate aiming of such firearms. As the range and accuracy of firearms such as rifles and pistols has increased, the popularity of telescopic sights has commensurately increased. It has therefore become important for firearm manufacturers to provide a method for universally and simply applying a telescopic sight on their firearms.

Important considerations in providing a telescopic sight mount are the simplicity and security of the mount. The ease with which a telescopic sight may be mounted or dismounted is critical since the sight is often separately stored from the firearm. Similarly, sights are often switched from firearm to firearm. It is also desirable to have a mounting system so that different sights may be interchanged within the mount or different sights with dedicated mounts may be interchanged upon the firearm.

It is critical that a telescopic sight be securely mounted to a firearm. The line of sight of a securely mounted telescopic sight may be adjusted once for the particular rifle and need not be adjusted after that. Less stable mounting devices would cause mis-aiming or would require continuous adjustment as the firearm is carried and jostled or fired.

It is also important for a telescopic mount sight to be relatively low profile, so that the line of sight of the telescopic sight is as close as possible to the firing axis of the firearm, increasing the accuracy of the sighting mechanism.

It is the principle objective of the present invention to provide a mounting for a telescopic gun sight wherein the mounting bracket may be slidingly engaged upon a tongue located on the firearm and fixedly secured by a clamping force exerted by two clamping brackets through the engagement of threaded screws. This arrangement serves to provide easy assembly and universal assembly and yet provides a very secure and stable mounting of the telescopic sight. Although the invention particularly pertains the mounting of telescopic sights, as is apparent from the enclosed description and drawings, the device is easily adapted to provide a mounting means for other types of gun sights. Further, although a common type of telescopic scope, commercially available, is particularly contemplated, the particular scope mounting brackets may be adapted to receive any type of scope available, depending on the needs of the user.

Other advantages of the present invention will become apparent from the following detailed description, taken into conjunction with the accompanying drawings in which.

DETAILED DESCRIPTION OF THE DRAWINGS

Figure 1:
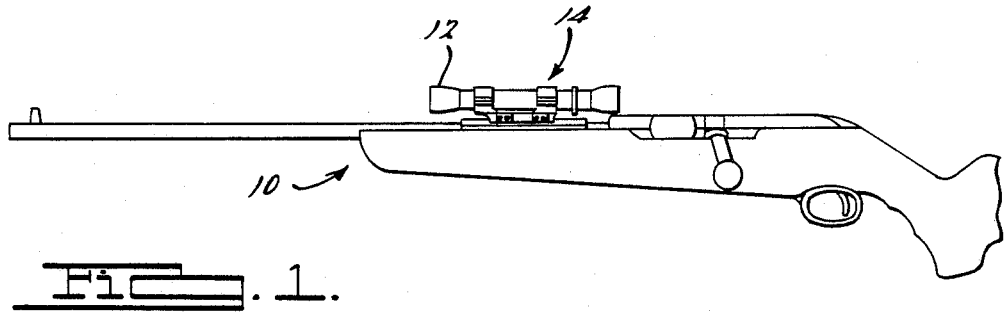
FIG. 1 is a perspective view of a gun having a scope mounted to the gun by means of the present invention.

Turning now to the drawings, FIG. 1 shows mounting bracket of the present invention 14 mounted upon a rifle 10 and holding a telescopic sight 12.

Figure 2:
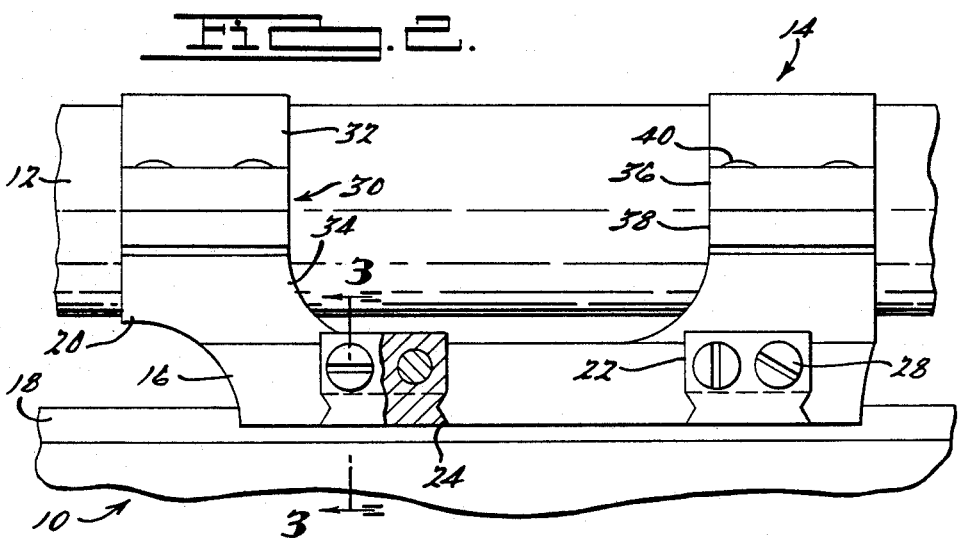
FIG. 2 is an exploded cross-sectional fragmentary view of the sight mount illustrated in FIG. 1 upon a rifle and containing a scope.

FIG. 2 illustrates the mounting bracket 14 which comprises a base 16 seated upon a mounting tongue 18 of the rifle 10, a pair of upwardly extending telescopic scope ring mounts 20, and a pair of clamping brackets 22, seated within a transverse keyway 24 within the base. Each clamping bracket 22 has a pair of apertures 26 of two distinct diameters, such that the heads of the clamping screws 28 may be recessed within the clamping bracket.

Figure 3:
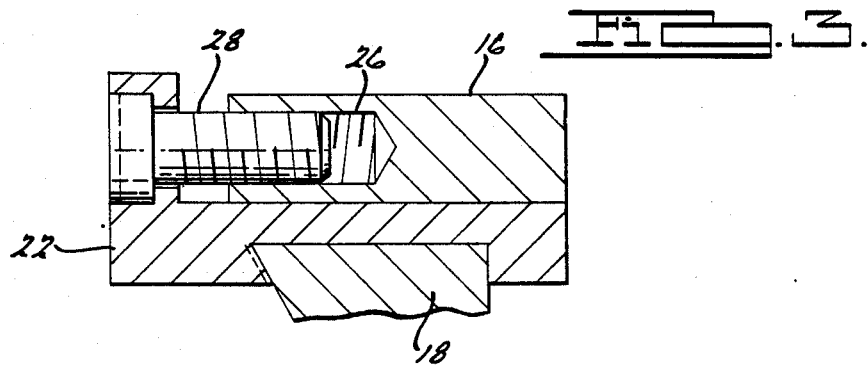
FIG. 3 is a cross-sectional view taken across section 3—3 of FIG. 2 illustrating the clamping bracket and clamping screws, viewed longitudinally.

As is best illustrated in FIG. 3, the clamping screws 28 are threaded and engage the apertures 26 in the side of the base 16, and when tightened transmit a clamping force through the clamping brackets 22 onto the mounting tongue 18 of the rifle. The spacing between the clamping bracket and the base has been exaggerated for illustration purposes.

As is also best illustrated in FIG. 3, the clamping brackets and the base have a groove which is adapted to be seated upon the mounting tongue of the rifle. As is illustrated in FIG. 3, it is preferred that the tongue and groove arrangement be a dove-tail tongue and groove or a half dove-tail tongue and groove.

The ring portions 30 of the scope mount are standard telescopic scope mounting rings which comprise an upper ring bracket 32 and a lower bracket 34 with curved inner surfaces configured to receive typical telescopic sights. The ring brackets 32 and 34 have apertured mounting flanges 36 and 38 respectively and are securely held together by plurality of mounting screws 40. When the screws 40 are tightened, a clamping force is exerted through the ring brackets, securely holding the telescopic sight 12. It will be appreciated that the upper ring scope brackets 32 are removable and may be replaced with other compatible upper ring brackets.

The mounting bracket described provides a secure clamping force the mounting tongue of the rifle through the two clamping brackets rather than a single point source of clamping force. The clamping brackets provide a broader surface of clamping force than is currently found among mounts that utilize a clamping device discrete from the seating mechanism. Further, the present invention provides a very secure and stable mounting for the telescopic sight. Although a unitary mounting base is preferred, separate mounting bases may be provided for each telescopic scope mounting ring. It can also be appreciated that the clamping screws are protected from extraneous contact which may effect the clamping force holding the mount and gun sight in position.

While the above summarizes the present invention, it will become apparent to those skilled in the art that modifications, variations, and alterations may be made without deviating from the scope and spirit of the present invention as described and claimed herein.

I claim:

1. A sight mount for a gun having an elongated mounting tongue; said sight mount comprising:

at least one elongated base having an longitudinal groove in its bottom surface configured to receive said elongated mounting tongue, said base having at least one horizontal keyway in its bottom surface, a side surface having threaded bores in association with said keyway at least one upwardly extending sight bracket adapted to receive a gun sight, and attachment means for securing said gun sight to said sight bracket;

at least one adjustment bracket configured to be slideably insertable into said keyway, said adjustment bracket having a groove in its bottom surface at least as deep as and having substantially the same cross-sectional configuration as said longitudinal groove in said elongated base and an upwardly extending apertured flange aligned with said threaded bores; and means engageable with said apertured flange and said threaded bores for transmitting a clamping force through said adjustment bracket on said mounting tongue.

2. The sight mount of claim 1 wherein said elongated mounting flange comprises a dove-tail flange and said longitudinal groove of said elongated base and said groove of said adjustment bracket comprise dove-tail grooves.

3. The sight mount of claim 1 wherein said elongated mounting tongue comprises a half dove-tail tongue and said longitudinal groove of said elongated base and said groove of said adjustment bracket comprise half dove-tail grooves.

4. The sight mount of claim 1 wherein said sight mount comprises one elongated base having two upwardly extending sight brackets.

5. The sight mount of claim 4 wherein said sight bracket further comprises a pair of upwardly extending lower mounting arms having inner surfaces curved to conform to the shape of a telescopic sight and lower connecting flanges having threaded apertures;

and said attachment means further comprises a pair of top mounting brackets each having a pair of downwardly extending upper mounting arms having inner surfaces curved to conform to the shape of said telescopic sight and upper connecting flanges having threaded apertures, and threaded fastener means for securing said upper connecting flange to said lower connecting flange.

6. A telescopic sight mount for a rifle having an elongated mounting flange, said sight mount comprising:
an elongated base;
a pair of longitudinally oriented, downwardly extending side members associated with said base configured to be seated upon said mounting flange;
at least one clamping bracket associated with one of said side members, said clamping bracket being slotted to receive said mounting flange; and
means for laterally impelling said clamping bracket to exert a clamping force upon said mounting flange.

7. A telescopic sight mount for a gun having an elongated dove-tail mounting tongue; said sight mount comprising:
an elongated base having a dove-tail longitudinal groove in its bottom surface configured to receive said elongated mounting tongue, said base having a pair of horizontal keyways in its bottom surface, a side surface having threaded bores in association with said keyway, a pair of upwardly extending lower mounting arms having inner surfaces curved to conform to the shape of said telescopic sight and lower connecting flanges having threaded apertures, a pair of top mounting brackets each having a pair of downwardly extending upper mounting arms having inner surfaces curved to conform to the shape of said telescopic sight and upper connecting flanges having threaded apertures, and threaded fastener means for securing said upper connecting flange to said lower connecting flange;
a pair of clamping brackets configured to be slideably insertable into said keyways, said clamping brackets having grooves in their bottom surface having substantially the same cross-sectional configuration as said longitudinal groove in said elongated base and an upwardly extending apertured flange aligned with said threaded bores; and
means engageable with said apertured flange and said threaded bores for transmitting a clamping force through said clamping brackets on said mounting tongue.

* * * * *